United States Patent
Calman

(10) Patent No.: US 8,544,725 B1
(45) Date of Patent: Oct. 1, 2013

(54) READABLE INDICIA FOR PROMOTIONS

(75) Inventor: Matthew A. Calman, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 13/595,421

(22) Filed: Aug. 27, 2012

(51) Int. Cl.
*G06F 17/00* (2006.01)

(52) U.S. Cl.
USPC .......................................................... 235/375

(58) Field of Classification Search
USPC .................................... 235/375, 493; 705/14
See application file for complete search history.

(56) References Cited

U.S. PATENT DOCUMENTS

| | | | | |
|---|---|---|---|---|
| 8,272,562 | B2 * | 9/2012 | Ziegler | 235/375 |
| 2002/0056756 | A1 * | 5/2002 | Cameron et al. | 235/468 |
| 2011/0153441 | A1 * | 6/2011 | Smith et al. | 705/21 |
| 2011/0168781 | A1 * | 7/2011 | Akesson | 235/492 |
| 2012/0166261 | A1 * | 6/2012 | Velusamy et al. | 705/14.16 |
| 2012/0191522 | A1 * | 7/2012 | McLaughlin et al. | 705/14.23 |
| 2012/0209842 | A1 * | 8/2012 | Bettridge et al. | 707/736 |
| 2012/0232981 | A1 * | 9/2012 | Torossian et al. | 705/14.27 |
| 2012/0253905 | A1 * | 10/2012 | Darragh | 705/14.19 |
| 2012/0258776 | A1 * | 10/2012 | Lord et al. | 455/556.1 |
| 2012/0303425 | A1 * | 11/2012 | Katzin et al. | 705/14.4 |

\* cited by examiner

*Primary Examiner* — Daniel Hess
*Assistant Examiner* — Steven J Malone
(74) *Attorney, Agent, or Firm* — Michael A. Springs; Moore & Van Allen, PLLC; Sreenivas Vedantam

(57) ABSTRACT

Embodiments of the invention are directed to systems, methods and computer program products for processing readable indicia. An exemplary system is configured to: receive information associated with readable indicia; determine whether the readable indicia is activated; and in response to determining the readable indicia is activated, process the readable indicia to determine at least one of advancement in a game or a reward. The processing of the readable indicia is based on transaction information associated with a purchase of an item. Additionally, the processing of the readable indicia is based on check-in information indicating a location of a user either prior to, during, or after a purchase of an item.

19 Claims, 2 Drawing Sheets

READABLE INDICIA FOR PROMOTIONS

BACKGROUND

A merchant may run a promotion by providing a physical game-playing piece with every purchase. A customer may collect game-playing pieces over a period of time and redeem the game-playing pieces for a reward. There is a need for a merchant to run a promotion without requiring customers to collect physical game-playing pieces.

BRIEF SUMMARY

Embodiments of the invention are directed to systems, methods and computer program products for processing readable indicia. An exemplary apparatus comprises a memory; a processor; and a computing module stored in the memory, executable by the processor, and configured to: receive information associated with readable indicia; determine whether the readable indicia is activated; and in response to determining the readable indicia is activated, process the readable indicia to determine at least one of advancement in a game or a reward.

In some embodiments, the module is further configured to process the readable indicia based on transaction information associated with a purchase of an item.

In some embodiments, the transaction information comprises information associated with a receipt associated with the purchase of the item.

In some embodiments, the module is further configured to process the readable indicia based on check-in information indicating a location of a user either prior to or after a purchase of an item.

In some embodiments, readable indicia associated with a first item is the same as or different from readable indicia associated with a second item.

In some embodiments, the module is further configured to store the information associated with the readable indicia.

In some embodiments, the game comprises a new instance of the game or a previously accessed instance of the game.

In some embodiments, the readable indicia comprises a Quick Response (QR) code.

In some embodiments, the apparatus comprises a portable mobile communication apparatus that comprises an image-capturing component, and the image of the readable indicia is captured by the portable mobile communication apparatus, wherein the processing occurs either inside or outside the portable mobile communication apparatus, and wherein a user of the portable mobile communication apparatus is prompted to upload the information associated with the readable indicia.

In some embodiments, the module is further configured to process the readable indicia based on identification information associated with the portable mobile communication apparatus.

In some embodiments, the module is further configured to determine whether the readable indicia has been activated.

In some embodiments, the readable indicia is activated based on an interaction with the readable indicia.

In some embodiments, the interaction comprises a thermo-sensitive interaction.

In some embodiments, the readable indicia comprises electronic readable indicia, wherein the electronic readable indicia is transmitted via at least one of email or text or multimedia message, or wherein the electronic readable indicia is presented on an electronic display.

In some embodiments, the readable indicia comprises physical readable indicia, wherein the physical readable indicia is printed on paper or attached to a purchased item, or wherein the physical readable indicia is presented on a static display.

In some embodiments, when the physical readable indicia is attached to the purchased item, wherein the physical readable indicia is covered with a seal, and wherein the seal is peeled off to expose the readable indicia.

In some embodiments, the module is further configured to: extract a link from the readable indicia; and initiate a user interface associated with the link.

In some embodiments, the reward is issued as at least one of an electronic coupon, an electronic stored value card, or a rebate.

In some embodiments, the module is further configured to initiate issuance of the reward to an account or an alias.

In some embodiments, the module is further configured to: receive authentication credentials; and wherein the module configured to process the readable indicia is further configured to process the readable indicia and the authentication credentials to determine at least one of advancement in a game or a reward.

In some embodiments, authentication credentials are input by a user of the portable mobile communication apparatus.

In some embodiments, the authentication credentials input by the user are first authentication credentials, and wherein second authentication credentials are comprised in the readable indicia.

In some embodiments, the module is further configured to extract the second authentication credentials from the readable indicia; and determine whether the first authentication credentials match the second authentication credentials.

In some embodiments, the module is configured to determine whether the authentication credentials match second authentication credentials accessed by the apparatus.

In some embodiments, the module is further configured to initiate an authentication prompt for receiving the authentication credentials in response to receiving the information associated with the readable indicia, the authentication credentials being associated with an account associated with the user.

In some embodiments, the readable indicia is comprised in a tag that transmits information wirelessly.

In some embodiments, the module is further configured to process the readable indicia based on whether the module has previously received the readable indicia.

In some embodiments, a method is provided for processing readable indicia. The method comprises receiving information associated with readable indicia; and processing the readable indicia to determine at least one of advancement in a game or a reward.

In some embodiments, a computer program product is provided for processing readable indicia. The computer program product comprises a non-transitory computer-readable medium comprising a set of codes for causing a computer to: receive information associated with readable indicia; and process the readable indicia to determine at least one of advancement in a game or a reward.

BRIEF DESCRIPTION OF THE DRAWINGS

Figure 1:
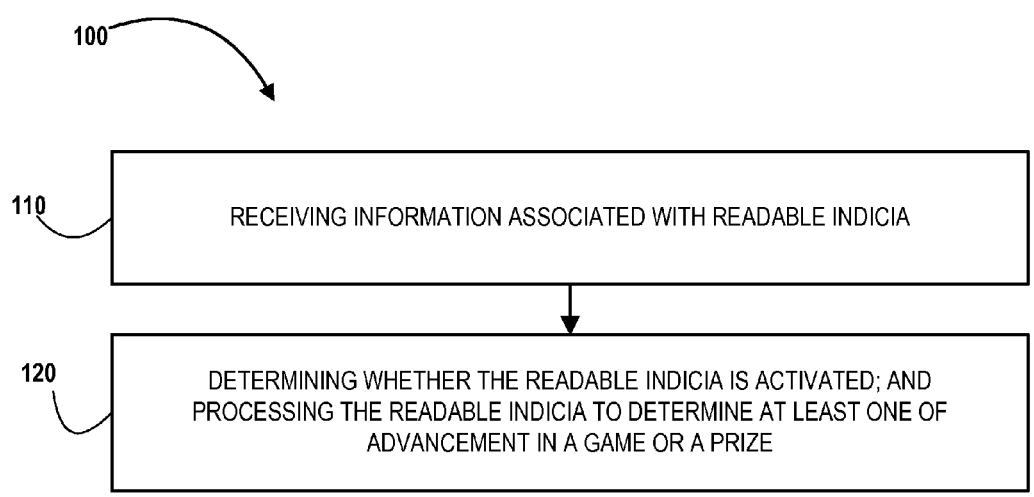
Figure 2:
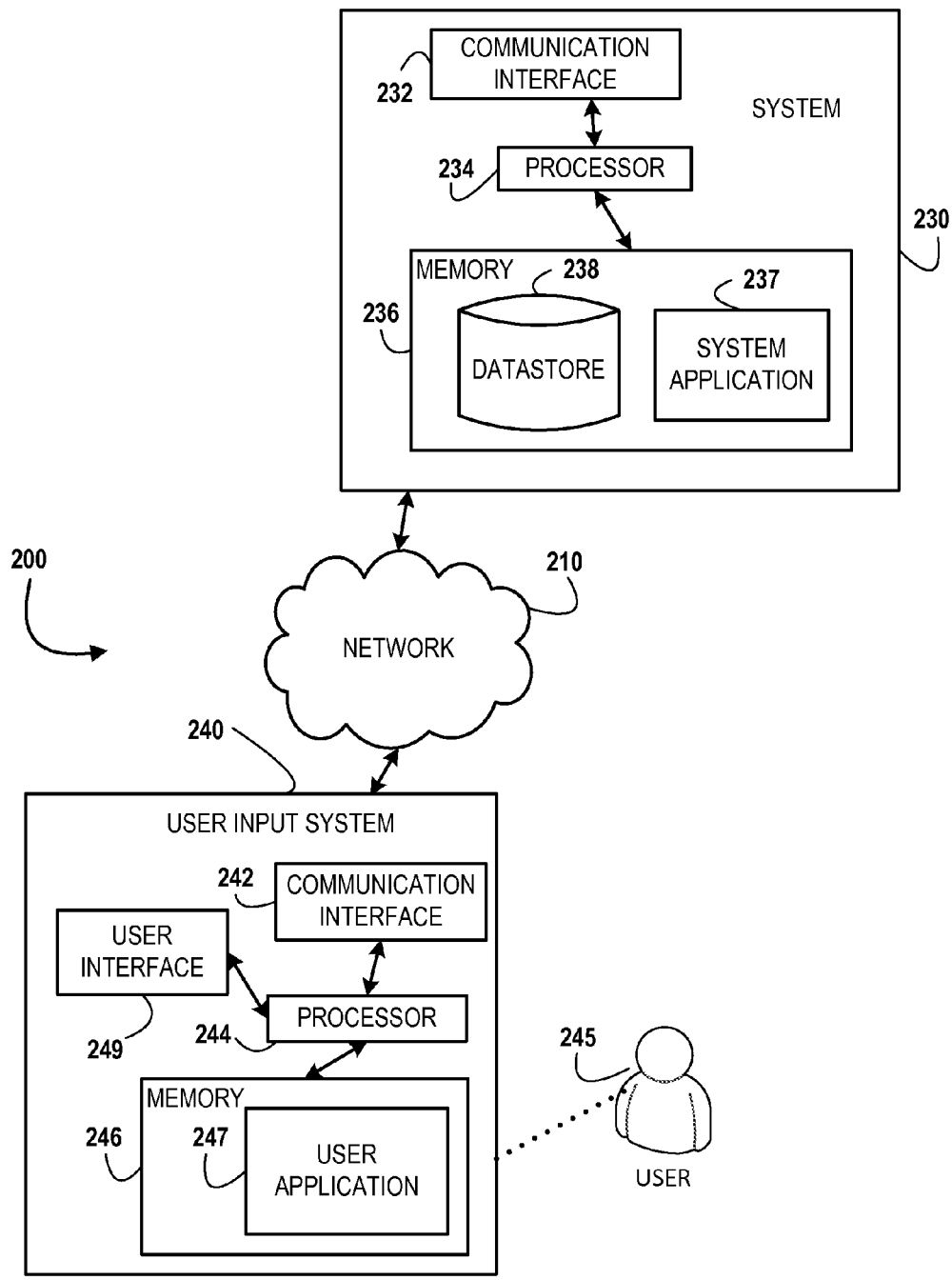

Having thus described embodiments of the invention in general terms, reference will now be made to the accompanying drawings, where:

FIG. 1 is a flowchart illustrating a general process flow for processing readable indicia, in accordance with embodiments of the present invention; and FIG. 2 is a block diagram illustrating technical components of a system for processing readable indicia, in accordance with embodiments of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Embodiments of the invention are directed to systems, methods and computer program products for processing readable indicia associated with a promotion. In some embodiments, the readable indicia comprises a code (e.g., barcode, Quick Response (QR) code, etc.). As used herein, a user may refer to a customer.

Referring now to FIG. 1, a general process flow 100 is provided for processing readable indicia. At block 110, the method comprises receiving information associated with readable indicia for a promotion. The merchant provides readable indicia on a purchased item or on a receipt associated with the purchased item. In embodiments where the readable indicia is attached to a purchased item, the readable indicia is covered with a seal (e.g., an opaque seal, a transparent or translucent seal, or the like). The seal may be peeled off (or scratched off) to expose the readable indicia. In some embodiments, the readable indicia is not covered with a seal. The readable indicia enables the user to participate in a promotion that is being run by a merchant. Therefore, the merchant may encourage purchase of items by issuing readable indicia associated with each item. In some embodiments, the readable indicia may be provided to the user regardless of whether the user makes a purchase at the merchant (e.g., the user may not make a purchase). The readable indicia may enable the user to at least one of participate in a game or redeem the readable indicia for a reward. The readable indicia may be at least one of computer-readable or human-readable. In some embodiments, the merchant may be a restaurant. The readable indicia may also be referred to as a "key."

In some embodiments, the readable indicia may be visible (e.g., not covered with a seal) or not visible (e.g., covered with a seal), but may be inactive or static until an activity is performed. An activity may be an interaction (e.g., a physical or electronic interaction) with the readable indicia. For example, when the readable indicia is located on a hamburger wrapper or on a drink cup, the readable indicia is activated when the hamburger is wrapped into the wrapper or when the drink cup is filled with the drink. Therefore, the readable indicia is thermo-sensitive and is activated based on the readable indicia being heated or cooled. As used herein, activated readable indicia may be processed to determine at least one of advancement in a game or a reward, while inactivated readable indicia may be unable to be processed to determine at least one of advancement in a game or a reward. The activity performed on the readable indicia may or may not be performed by the user. For example, if a seal associated with the readable indicia needs to be peeled or scratched off, the activity may be performed by the user. In some embodiments, the activity may be performed by an agent of the merchant and/or a computing device associated with the merchant. For example, prior to or after wrapping the hamburger in the wrapper, the readable indicia associated with the wrapper may be scanned by an electronic scanner, wherein the scanning activates the readable indicia.

In some embodiments, the readable indicia is located on the purchased item (or on the packaging associated with the purchased item), but is inactive until a receipt for the purchased item is printed (e.g., when a user pays via a payment card) or electronically delivered to the user (e.g., when a user pays via a mobile device). The production of the receipt (or transmission of the receipt to the user) activates the readable indicia. In some embodiments, a readable indicia associated with a purchase item may qualify for a reward, while other readable indicia associated with other items do not qualify for the reward. The readable indicia that qualifies for the reward may be different (e.g., a different code) from the readable indicia that does not qualify for the reward. In other embodiments, the same readable indicia may be located (e.g., printed) on multiple items, and the production of the receipt determines whether the readable indicia associated with a particular purchased item qualifies for the reward. Therefore, a reward associated with a readable indicia associated with a purchased item may be determined as part of a payment transaction (e.g., a mobile payment transaction).

In order to submit an entry for winning a reward (or for advancing in a game), the user's mobile device may receive information associated with the user's receipt (e.g., receive an electronic receipt, scan a physical receipt, capture an image of a physical receipt, user manually enters a code associated with a physical receipt, or the like) and transmit the information to the merchant (or a system associated with the merchant). In some embodiments, the information associated with the receipt may be transmitted along with information associated with the readable indicia. In some embodiments, in order to receive a reward or advance in a game, the user may need to execute a plurality of purchase transactions within a predetermined period (e.g., 3 purchase transactions in 30 days). Additionally, each purchase transaction may need to be associated with a particular purchase item (e.g., the first transaction needs to include a drink, the second transaction needs to include a hamburger, or the like) and/or associated with a particular minimum amount (e.g., $10). Therefore, information associated with the user's transaction history may be transmitted as part of the user's entry, or alternatively, upon transmitting the user's entry to the system described herein, the system may pull the user's transaction history.

In some embodiments, the readable indicia may be located at the merchant, but may not necessarily be located on the purchased item or on the receipt. For example, the readable indicia may be located on the wall (e.g., a static display such as a sticker or poster or a dynamic display on a display screen) of the merchant's establishment. As a further example, the readable indicia may be the logo of the merchant.

In some embodiments, the user may "check-in" at the merchant's establishment using an application (e.g., a social networking application or location-determining application) on the user's mobile device. The application may determine the user's location based on Global Positioning System (GPS) information associated with the mobile device. By "checking-in" at the merchant's establishment, the user indicates the user's presence at the merchant's establishment at a particular time. Therefore, in addition to the user's mobile device receiving information associated with the readable indicia (and/or the transaction receipt), the user may have to check-in using the user's mobile device. In order to submit an entry for winning a reward (or for advancing in a game), the user may need to transmit to a system (e.g., the merchant's system) information associated with the user's "check-in" along with information associated with readable indicia and information associated with the receipt associated with the user's purchase transaction.

In some embodiments, in order to submit an entry for winning a reward (or for advancing in a game), the user's mobile device may transmit the phone number, or other identification information (International Mobile Equipment Identity (IMEI) number) associated with the mobile device (e.g., the mobile device that "checks-in" at the merchant's establishment, the mobile device that receives readable indicia and/or transaction information, or the like).

Upon receiving the readable indicia, the mobile device, via a user interface of the mobile device, may prompt or request the user to upload the readable indicia to a system described herein (e.g., external server). The user may either approve or reject this request. Upon uploading the readable indicia, the system determines at least one of whether the user is entitled to advancement in a game or a reward.

The readable indicia (or a plurality of readable indicia) may be redeemed for advancement in a game. Therefore, the readable indicia may be redeemed for an electronic game-playing piece. The game may be accessed on the user's mobile device when the mobile device receives the readable indicia. Therefore, when the mobile device receives the readable indicia, the mobile device is triggered to initiate a game-playing application or access an external website associated with the game. The game may be a new instance of the game, or may be an instance of a game that was previously played by the user and the user is now accessing the game to continue playing the game. The user may be prompted to authenticate to the user's account in order to access the game. Upon accessing the game, the readable indicia may be processed to determine advancement in the game. When the user reaches a predetermined level in the game, the system may prompt the user to claim a reward. The system may enable the user to choose from a plurality of rewards. The user's position in the game may be automatically saved when the user exits the game. In some embodiments, the user may access the game without manually entering authentication credentials. In such embodiments, the system may authenticate the user based on identification information associated with the mobile device that receives the readable indicia (e.g., device identification information, network address, phone number, or the like) and transmits the readable indicia to a system (e.g., an external server) described herein.

Additionally or alternatively, the readable indicia may be redeemed for a reward. A reward may be a stored value card that may be redeemed at the merchant (e.g., the merchant that runs the promotion). In some embodiments, the reward comprises an electronic coupon that can be redeemed for an item at the merchant. In some embodiments, the reward comprises a rebate associated with a purchase that the user previously executed. The stored value card or electronic coupon may be stored electronically on an account (or a mobile wallet) associated with the user. The account (or mobile wallet) may be a merchant account associated with the user, a financial institution account associated with the user, or the like. Therefore, the user may receive the reward without providing the user's account information to the merchant.

In some embodiments, the user's mobile device transmits the readable indicia to a system (e.g., an external server). The system may be associated with the merchant. The system determines whether the system has previously received the readable indicia (e.g., from the user or from another user). If the system has previously received the readable indicia, the user may not be able to redeem a reward or achieve an advancement in the game. Additionally, the mobile device user interface may present a rejection message to the user indicating that the merchant's system has already received the readable indicia previously. Alternatively, the system may permit a predetermined number of users (e.g., ten users) that transmit the readable indicia to the system to redeem a reward or achieve an advancement in a game. Therefore, if the user is the eleventh user to transmit the readable indicia to the system, the user will be unable to redeem a reward or achieve an advancement in the game. Additionally, the mobile device user interface may present a rejection message to the user indicating that the maximum number of users have previously transmitted the readable indicia to the system.

In alternate embodiments, the merchant may provide the readable indicia in electronic form (e.g., via email, text or multimedia message, etc.). The readable indicia may be presented on an electronic receipt associated with a purchase transaction. The readable indicia may be transmitted simultaneously with the purchase or a predetermined period after the purchase. In some embodiments, the readable indicia comprises visual indicia, e.g., a barcode, a Quick Response (QR) code, etc. The readable indicia may comprise any one-dimensional or two-dimensional code. Therefore, the user may use a portable mobile communication device or apparatus ("mobile device") that comprises an image-capturing component (e.g., a camera) to capture the image of the readable indicia. In some embodiments, this readable indicia is stored in the mobile device. In other embodiments, this readable indicia is automatically transmitted to an external server. In embodiments where the readable indicia is in electronic form, the readable indicia may be dynamically generated after the user selects an option to view the readable indicia.

In some embodiments, a user may answer a series of questions (e.g., a feedback form) at a store kiosk in order to receive the readable indicia. Once the user has completed answering the questions, the store kiosk presents readable indicia. The user may receive information associated with the presented readable indicia using a portable mobile communication device.

The readable indicia may comprise any indicia, visual or non-visual, where information associated with the indicia is receivable or readable (e.g., scannable) by the mobile device. For example, the readable indicia is comprised in a tag (e.g., radio frequency identification (RFID) tag, near field communication (NFC) tag, etc.). A user may bring a mobile device in close proximity to the tag in order to receive information (e.g., readable indicia) associated with the tag.

In some embodiments, the readable indicia may be processed by at least one of the mobile device or the external server to determine a link (e.g., a hyperlink) associated with the readable indicia. The user interface of the mobile device may present the link and may prompt the user to visit the link. The link may transport the user to a user interface page for initiating the process of participating in a promotion (e.g., participating in a game, redeeming for a reward, or the like). The user interface page may prompt the user to enter information (e.g., selection of which game the user wants to play, selection of whether the user wants to redeem the readable indicia for a reward, or the like).

In some embodiments, at block 110, the method additionally comprises receiving authentication credentials. In some embodiments, in response to receiving the readable indicia, the mobile device initiates an authentication prompt (e.g., at the link described above) for receiving the authentication credentials from the user. For example, the authentication prompt may comprise a prompt or challenge question for which the user knows the answer. These authentication credentials may have been previously received from the merchant separately from the readable indicia. Alternatively, the authentication credentials may be printed on the purchased item or on a receipt associated with the purchased item. As a further example, the merchant may have sent a personal identification number ("PIN") code to the user via mail, email, text or multimedia message, etc. As a further example, the user may have previously logged onto the merchant's website in order to set up authentication credentials for participating in the promotion or in order to establish a merchant account associated with the user.

Subsequently, the user inputs authentication credentials onto a user interface of the mobile device. In some embodiments, this input may comprise entering a password. In some embodiments, this input may comprise entering an alias. For example, the alias may comprise a phone number, email address, or social networking identification information associated with the user. In other embodiments, this input may comprise entering an answer to a question. In still other embodiments, this input may comprise selecting a picture. In some embodiments, the received authentication credentials are stored in the mobile device. In other embodiments, the received authentication credentials are automatically transmitted to an external server.

At block 120, the method comprises processing the readable indicia to determine at least one of advancement in a game or a reward. As described previously, the processing comprises determining whether the readable indicia has been activated (e.g., either physically or electronically). If the readable has been activated, the readable indicia may be processed as described herein. If the readable indicia has not been activated, the readable indicia may not be processed. In embodiments where the readable indicia is stored in the mobile device, the processing of the readable indicia occurs in the mobile device. In embodiments where the readable indicia is transmitted to an external server, the processing of the readable indicia occurs outside the mobile device, i.e., at the external server. The processing comprises comparing the information associated with the readable indicia to information stored in at least one of the mobile device or the external server to determine whether to enable the user to participate in the promotion (e.g., determine advancement in a game, determine type of reward available for redemption, or the like).

As described previously, in other embodiments, the user is prompted to enter authentication credentials on the mobile device user interface. Prior to enabling the user to enter the authentication credentials, one or more mobile interface pages of advertisements may be presented to the user. In such embodiments, the method, at block 120, further comprises processing the authentication credentials to enable the user to participate in the promotion. In embodiments where the authentication credentials are stored in the mobile device, the processing of the authentication credentials occurs in the mobile device. In embodiments where the authentication credentials are transmitted to an external server, the processing of the authentication credentials occurs outside the mobile device, i.e., at the external server. The processing comprises comparing the authentication credentials to information stored in at least one of the mobile device or the external server.

In some embodiments, the authentication credentials are comprised in the readable indicia. Therefore, the authentication credentials input by the user are compared to the authentication credentials extracted from the readable indicia. In other embodiments, the authentication credentials are not comprised in the readable indicia. In such embodiments, the authentication credentials input by the user are compared to information (e.g., authentication credentials) stored in at least one of the mobile device or external server or accessed by at least one of the mobile device or external server from an external datastore.

If the mobile device or the external server determines a match between the authentication credentials input by the user and the authentication credentials either extracted from the readable indicia or stored in at least one of the mobile device or external server, the readable indicia is processed as described herein (e.g., the user is granted access to the user's account, the user's game, or the like).

In other embodiments, after the user authenticates himself or herself, the user provides an alias so that the merchant can send the reward to the alias. In some embodiments, the reward comprises an electronic coupon that can be redeemed for an item at the merchant. For example, the alias may comprise a phone number, email address, or social networking identification information associated with the user. Therefore, the user may have pre-registered the user's alias with the financial institution associated with the user's account. Therefore, when the merchant sends the reward to the alias, the financial institution receives the reward, interprets the alias, and forwards the reward to the user's account. Therefore, the user receives the reward without providing the user's account information to the merchant. In some embodiments, the merchant may provide an incentive to the user for receiving the reward via alias. For example, the merchant may upgrade the electronic coupon such that it is redeemable for an item of higher value if the user chooses this method of receiving the reward. In some embodiments, prior to enabling the user to provide an alias, one or more mobile interface pages of advertisements may be presented to the user.

Referring now to FIG. 2, FIG. 2 presents an exemplary block diagram of the system environment 200 for implementing the process flow 100 described in FIG. 1, in accordance with embodiments of the present invention. As illustrated, the system environment 200 includes a network 210, a system 230, and a user input system 240. Also shown in FIG. 2 is a user 245 of the user input system 240. The user input system 240 may be a mobile device described herein. The user 245 may be a person who uses the user input system 240 to execute a user application 247. The system 230 may be the external server described herein. The user application 247 and/or the system application 237 may incorporate one or more parts of the process flow 100 or any other function described herein. The system 230 may be associated with (and/or controlled by) a merchant (e.g., the merchant that issues the readable indicia), a financial institution, or the like.

As shown in FIG. 2, the system 230, and the user input system 240 are each operatively and selectively connected to the network 210, which may include one or more separate networks. In addition, the network 210 may include a local area network (LAN), a wide area network (WAN), and/or a global area network (GAN), such as the Internet. The network may also include a mobile telecommunication network. It will also be understood that the network 210 may be secure and/or unsecure and may also include wireless and/or wireline and/or optical interconnection technology.

The user input system 240 may include any computerized apparatus that can be configured to perform any one or more of the functions of the user input system 240 described and/or contemplated herein. For example, the user 245 may use the user input system 240 to transmit and/or receive information or commands to and from the system 230. In some embodiments, for example, the user input system 240 may include a personal computer system, a mobile computing device, a personal digital assistant, a mobile phone, a network device, and/or the like. As illustrated in FIG. 2, in accordance with some embodiments of the present invention, the user input system 240 includes a communication interface 242, a processor 244, a memory 246 having an user application 247 stored therein, and a user interface 249. In such embodiments, the communication interface 242 is operatively and selectively connected to the processor 244, which is operatively and selectively connected to the user interface 249 and the memory 246. In some embodiments, the user 245 may use the user application 247 to execute processes described with respect to the process flows described herein.

Each communication interface described herein, including the communication interface 242, generally includes hardware, and, in some instances, software, that enables the user input system 240, to transport, send, receive, and/or otherwise communicate information to and/or from the communication interface of one or more other systems on the network 210. For example, the communication interface 242 of the user input system 240 may include a wireless transceiver, modem, server, electrical connection, and/or other electronic device that operatively connects the user input system 240 to another system such as the system 230. The wireless transceiver may include a radio circuit to enable wireless transmission and reception of information.

Each processor described herein, including the processor 244, generally includes circuitry for implementing the audio, visual, and/or logic functions of the user input system 240. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the user application 247 of the memory 246 of the user input system 240.

Each memory device described herein, including the memory 246 for storing the user application 247 and other information, may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

As shown in FIG. 2, the memory 246 includes the user application 247. In some embodiments, the user application 247 includes an interface for communicating with, navigating, controlling, configuring, and/or using the user input system 240. In some embodiments, the user application 247 includes computer-executable program code portions for instructing the processor 244 to perform one or more of the functions of the user application 247 described and/or contemplated herein. In some embodiments, the user application 247 may include and/or use one or more network and/or system communication protocols.

Also shown in FIG. 2 is the user interface 249. In some embodiments, the user interface 249 includes one or more output devices, such as a display and/or speaker, for presenting information to the user 245. In some embodiments, the user interface 249 includes one or more input devices, such as one or more buttons, keys, dials, levers, directional pads, joysticks, accelerometers, controllers, microphones, touchpads, touchscreens, haptic interfaces, microphones, scanners, motion detectors, cameras, and/or the like for receiving information from the user 245. In some embodiments, the user interface 249 includes the input and display devices of a mobile device, which are operable to receive and display information.

FIG. 2 also illustrates a system 230, in accordance with an embodiment of the present invention. The system 230 may include any computerized apparatus that can be configured to perform any one or more of the functions of the system 230 described and/or contemplated herein. In accordance with some embodiments, for example, the system 230 may include a computer network, an engine, a platform, a server, a database system, a front end system, a back end system, a personal computer system, and/or the like. Therefore, the system 230 may be an external server as described herein. In some embodiments, such as the one illustrated in FIG. 2, the system 230 includes a communication interface 232, a processor 234, and a memory 236, which includes a system application 237 and a datastore 238 stored therein. As shown, the communication interface 232 is operatively and selectively connected to the processor 234, which is operatively and selectively connected to the memory 236.

It will be understood that the system application 237 may be configured to implement any one or more portions of the various user interfaces and/or process flow described herein. The system application 237 may interact with the user application 247. It will also be understood that, in some embodiments, the memory includes other applications. It will also be understood that, in some embodiments, the system application 237 is configured to communicate with the datastore 238, the user input system 240, etc.

It will be further understood that, in some embodiments, the system application 237 includes computer-executable program code portions for instructing the processor 234 to perform any one or more of the functions of the system application 237 described and/or contemplated herein. In some embodiments, the system application 237 may include and/or use one or more network and/or system communication protocols.

In addition to the system application 237, the memory 236 also includes the datastore 238. As used herein, the datastore 238 may be one or more distinct and/or remote datastores. In some embodiments, the datastore 238 is not located within the system and is instead located remotely from the system. In some embodiments, the datastore 238 stores information or data described herein.

It will be understood that the datastore 238 may include any one or more storage devices, including, but not limited to, datastores, databases, and/or any of the other storage devices typically associated with a computer system. It will also be understood that the datastore 238 may store information in any known way, such as, for example, by using one or more computer codes and/or languages, alphanumeric character strings, data sets, figures, tables, charts, links, documents, and/or the like. Further, in some embodiments, the datastore 238 may include information associated with one or more applications, such as, for example, the system application 237. It will also be understood that, in some embodiments, the datastore 238 provides a substantially real-time representation of the information stored therein, so that, for example, when the processor 234 accesses the datastore 238, the information stored therein is current or substantially current.

It will be understood that the embodiment of the system environment illustrated in FIG. 2 is exemplary and that other embodiments may vary. As another example, in some embodiments, the system 230 includes more, less, or different components. As another example, in some embodiments, some or all of the portions of the system environment 200 may be combined into a single portion. Likewise, in some embodiments, some or all of the portions of the system 230 may be separated into two or more distinct portions.

In addition, the various portions of the system environment 200 may be maintained for and/or by the same or separate parties. It will also be understood that the system 230 may include and/or implement any embodiment of the present invention described and/or contemplated herein. For example, in some embodiments, the system 230 is configured to implement any one or more of the embodiments of the process flow 100 described and/or contemplated herein in connection with FIG. 1 or any other process flow described herein. Additionally, the system 230 is configured to initiate presentation of any of the user interfaces described herein.

In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, microcode, stored procedures in a database, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. An apparatus for processing readable indicia, the apparatus comprising:
   a memory;
   a processor; and
   a computing module stored in the memory, executable by the processor, and configured to:
   receive location information associated with a user;
   receive authentication credentials input by the user;
   receive readable indicia associated with a purchase of an item;
   determine whether the readable indicia is activated, wherein the readable indicia is thermo-sensitive, wherein the readable indicia is permanently activated based on both the purchase of the item and a thermo-sensitive interaction between the item and the readable indicia, wherein the interaction is performed following the purchase of the item, wherein the readable indicia is not activated prior to the purchase of the item;
   in response to determining the readable indicia is activated, determine whether the module has previously received the readable indicia;
   in response to determining the module has not previously received the readable indicia and in response to determining the location information indicates the user's presence at a merchant associated with the purchase, process the readable indicia and the authentication credentials to determine at least one of advancement in a game or a reward; and
   in response to determining the module has previously received the readable indicia, initiate presentation of a rejection message to the user, wherein the rejection message informs the user that the readable indicia has been received previously.

2. The apparatus of claim 1, wherein the module is further configured to process the readable indicia based on transaction information associated with the purchase of the item.

3. The apparatus of claim 2, wherein the transaction information comprises information associated with a receipt associated with the purchase of the item.

4. The apparatus of claim 1, wherein the module is further configured to process the readable indicia based on check-in information indicating a location of the user either prior to or after the purchase of the item.

5. The apparatus of claim 1, wherein readable indicia associated with a first item is the same as or different from readable indicia associated with a second item.

6. The apparatus of claim 1, wherein the readable indicia comprises a Quick Response (QR) code.

7. The apparatus of claim 1, wherein the apparatus comprises a portable mobile communication apparatus that comprises an image-capturing component, and wherein an image of the readable indicia is captured by the portable mobile communication apparatus, wherein the processing occurs either inside or outside the portable mobile communication apparatus, and wherein the user of the portable mobile communication apparatus is prompted to upload the information associated with the readable indicia.

8. The apparatus of claim 7, wherein the module is further configured to process the readable indicia based on identification information associated with the portable mobile communication apparatus.

9. The apparatus of claim 1, wherein the readable indicia comprises electronic readable indicia, wherein the electronic readable indicia is transmitted via at least one of email or text or multimedia message, or wherein the electronic readable indicia is presented on an electronic display.

10. The apparatus of claim 1, wherein the readable indicia comprises physical readable indicia, wherein either the physical readable indicia is printed on paper or attached to the purchased item, or the physical readable indicia is presented on a static display.

11. The apparatus of claim 10, wherein when the physical readable indicia is attached to the purchased item, the physical readable indicia is covered with a seal, and the seal is peeled or scratched off to expose the readable indicia.

12. The apparatus of claim 1, wherein the interaction comprises at least one of a physical or electronic interaction.

13. The apparatus of claim 1, wherein the module is further configured to:
   extract a link from the readable indicia; and
   initiate a user interface associated with the link.

14. The apparatus of claim 1, wherein the reward is issued as at least one of an electronic coupon, an electronic stored value card, or a rebate on a purchase.

15. The apparatus of claim 1, wherein the module is further configured to:
   initiate issuance of the reward to an account or an alias.

16. The apparatus of claim 1, wherein processing the readable indicia comprises comparing the readable indicia to stored information.

17. The apparatus of claim 1, wherein the readable indicia is comprised in a tag that transmits information wirelessly.

18. A method for processing readable indicia, the method comprising:
   receiving location information associated with a user;
   receiving authentication credentials input by the user;
   receiving readable indicia associated with a purchase of an item;
   determining whether the readable indicia is activated, wherein the readable indicia is thermo-sensitive, wherein the readable indicia is permanently activated based on both the purchase of the item and a thermo-sensitive interaction between the item and the readable indicia, wherein the interaction is performed following the purchase of the item, wherein the readable indicia is not activated prior to the purchase of the item;
   in response to determining the readable indicia is activated, determining whether the module has previously received the readable indicia;

in response to determining the module has not previously received the readable indicia and in response to determining the location information indicates the user's presence at a merchant associated with the purchase, processing the readable indicia and the authentication credentials to determine at least one of advancement in a game or a reward; and in response to determining the module has previously received the readable indicia, initiating presentation of a rejection message to the user, wherein the rejection message informs the user that the readable indicia has been received previously.

19. A computer program product for processing readable indicia, the computer program product comprising:

a non-transitory computer-readable medium comprising a set of codes for causing a computer to:

receive location information associated with a user;

receive authentication credentials input by the user;

receive readable indicia associated with a purchase of an item;

determine whether the readable indicia is activated, wherein the readable indicia is thermo-sensitive, wherein the readable indicia is permanently activated based on both the purchase of the item and a thermo-sensitive interaction between the item and the readable indicia, wherein the interaction is performed following the purchase of the item, wherein the readable indicia is not activated prior to the purchase of the item;

in response to determining the readable indicia is activated, determine whether the module has previously received the readable indicia;

in response to determining the module has not previously received the readable indicia and in response to determining the location information indicates the user's presence at a merchant associated with the purchase, process the readable indicia and the authentication credentials to determine at least one of advancement in a game or a reward; and in response to determining the module has previously received the readable indicia, initiate presentation of a rejection message to the user, wherein the rejection message informs the user that the readable indicia has been received previously.

* * * * *